(12) United States Patent
Lengsfeld et al.

(10) Patent No.: US 12,394,216 B2
(45) Date of Patent: Aug. 19, 2025

(54) METHOD FOR PREDICTING AN EGO-LANE FOR A VEHICLE

(71) Applicant: Robert Bosch GmbH, Stuttgart (DE)

(72) Inventors: Alexander Lengsfeld, Bad Muender (DE); Philip Lenz, Holle (DE)

(73) Assignee: ROBERT BOSCH GMBH, Stuttgart (DE)

( * ) Notice: Subject to any disclaimer, the term of this patent is extended or adjusted under 35 U.S.C. 154(b) by 358 days.

(21) Appl. No.: 17/883,846

(22) Filed: Aug. 9, 2022

(65) Prior Publication Data

US 2023/0052594 A1    Feb. 16, 2023

(30) Foreign Application Priority Data

Aug. 12, 2021  (DE) ...................... 10 2021 208 830.9

(51) Int. Cl.
*G06V 20/56* (2022.01)
*B60W 30/10* (2006.01)
(Continued)

(52) U.S. Cl.
CPC ....... *G06V 20/588* (2022.01); *G01C 21/3819* (2020.08); *G06V 10/82* (2022.01);
(Continued)

(58) Field of Classification Search
CPC .. G06V 20/588; G06V 10/82; G06V 2201/12; G01C 21/3819; G01C 21/3407;
(Continued)

(56) References Cited

U.S. PATENT DOCUMENTS

| 11,634,156 B1* | 4/2023 | Zhou ........................ G06N 3/08 |
| | | 701/41 |
| 11,685,402 B2* | 6/2023 | Lee .................. B60W 50/0205 |
| | | 701/27 |

(Continued)

FOREIGN PATENT DOCUMENTS

DE    102017223206 A1    6/2019

OTHER PUBLICATIONS

Jackel, Larry: "Researching and Developing an Autonomous Vehicle Lane-Following System," NVIDIA Developer Blog, Jan. 20, 2021, URL:https://developer.nvidia.com/blog/researchingand-developing-an-autonomous-vehicle-lanefollowing-system Archived in http://www.archive.org, [accessed Aug. 4, 2022], pp. 1-9.

*Primary Examiner* — Wesley J Tucker
(74) *Attorney, Agent, or Firm* — NORTON ROSE FULBRIGHT US LLP

(57) ABSTRACT

A method for predicting an ego-lane for a vehicle. The method includes: receiving at least one image captured by at last one camera sensor of the vehicle, which depicts a lane that may be used by a vehicle; ascertaining a center line of the lane, which extends through a center of the lane, by implementing a trained neural network on the captured image, the neural network being trained via regression to ascertain a center line of a lane, which extends in a center of the lane, based on captured images of the lane; outputting a plurality of parameters, which describe the center line of the lane, via the neural network; generating the center line based on the parameters of the center line; identifying the center line of the lane as the ego-lane of the vehicle; and providing the ego-lane.

13 Claims, 3 Drawing Sheets

(51) Int. Cl.
*G01C 21/00* (2006.01)
*G06V 10/82* (2022.01)

(52) U.S. Cl.
CPC ....... *B60W 30/10* (2013.01); *B60W 2420/403* (2013.01); *B60W 2556/40* (2020.02); *G06V 2201/12* (2022.01)

(58) Field of Classification Search
CPC . G01C 21/28; B60W 30/10; B60W 2420/403; B60W 2556/40
See application file for complete search history.

(56) References Cited

U.S. PATENT DOCUMENTS

| | | | | |
|---|---|---|---|---|
| 2016/0327400 | A1* | 11/2016 | Shikimachi | G01C 21/30 |
| 2019/0384304 | A1* | 12/2019 | Towal | G05D 1/0221 |
| 2020/0026282 | A1* | 1/2020 | Choe | G05D 1/0257 |
| 2020/0096359 | A1* | 3/2020 | Sakr | G05D 1/0278 |
| 2020/0249684 | A1* | 8/2020 | Onofrio | G08G 1/167 |
| 2020/0324795 | A1* | 10/2020 | Bojarski | G06V 10/764 |
| 2021/0049780 | A1* | 2/2021 | Westmacot | G06T 7/579 |
| 2021/0201145 | A1* | 7/2021 | Pham | G06V 20/56 |
| 2022/0349725 | A1* | 11/2022 | Chreptyk | G01C 21/32 |
| 2023/0099494 | A1* | 3/2023 | Kocamaz | G06V 20/58 |
| | | | | 382/103 |
| 2023/0334876 | A1* | 10/2023 | Chen | G06T 9/00 |
| 2024/0140431 | A1* | 5/2024 | Aizawa | B60W 30/18159 |

* cited by examiner

METHOD FOR PREDICTING AN EGO-LANE FOR A VEHICLE

CROSS REFERENCE

The present application claims the benefit under 35 U.S.C. § 119 of German Patent Application No. DE 10 2021 208 830.9 filed on Aug. 12, 2021, which is expressly incorporated herein by reference in its entirety.

FIELD

The present invention relates to a method for predicting an ego-lane for a vehicle.

BACKGROUND INFORMATION

Determining the ego-lane of a vehicle, and predicting it in the future, is a fundamental element in environment sensing and therefore in topological road layout understanding for autonomous driving. For this purpose, in a simple form, camera images of a mono camera may be used to predict the ego-lane of a vehicle in the image. With the aid of a convolutional neural network (CNN), such tasks can be described as classification, in which an individual mono camera image is used as an input. However, this approach has various weaknesses. Classic lane line detection is usually model based, so only lines which can be represented by a clothoid are detected. The search area for possible lane marking candidates is thus significantly restricted. However, only higher order roads are built according to clothoid models, e.g., freeways. On the other hand, country roads, or even older freeways, are not built according to these models so that, in these cases, lanes often cannot be detected. A further problem with this approach is that the search for lane markings does not allow for regulation at all times. In particular, roadwork sites, smaller highways or even urban roads and main through-roads often do not possess lane markings.

SUMMARY

An object of the present invention, therefore, is to provide an improved method for predicting an ego-lane for a vehicle.

This object may be achieved by the method for predicting an ego-lane for a vehicle according to the present invention. Advantageous configurations of the present invention are disclosed herein.

According to one aspect of the present invention, a method for predicting an ego-lane for a vehicle is provided, comprising: receiving at least one image captured by at last one camera sensor of the vehicle, which represents a lane that may be used by a vehicle;

ascertaining a center line of the lane, which extends through a center of the lane, by implementing a trained neural network on the captured image, the neural network being trained via regression to ascertain a center line of a lane, which extends in a center of the lane, based on captured images of the lane;

outputting a plurality of parameters, which describe the center line of the lane, via the neural network;

generating the center line based on the parameters of the center line;

identifying the center line of the lane as an ego-lane of the vehicle; and providing the ego-lane.

A technical advantage may thus be achieved that an improved method for predicting an ego-lane for a vehicle may be provided. To this end, the method according to the present invention provides for a correspondingly trained neural network to be applied to images captured by at least one camera sensor of a vehicle, the captured images representing at least one lane that may be used by the vehicle, and for a center line, which extends through a center of the lane, to be detected via the artificial neural network. The vehicle may be driving in the lane during the capture of the images, i.e., the images may be captured while the vehicle is moving. It is also possible, however, that the vehicle is not yet driving in the lane during the capture of the images, for example because the vehicle is only just turning into the represented lane at the time of the image capture or because the vehicle has not yet actively set off at the time of the image capture. The artificial neural network is trained via regression to ascertain corresponding center lines based on captured lane images. Here, the ascertainment of the corresponding center line is not realized via classification of the captured images, in which image points of the captured images are assigned either to a center line to be detected or to a corresponding background. Instead, the ascertainment of the center line is realized by the correspondingly trained neural network via regression, the neural network ascertaining a plurality of parameters, which are suitable for depicting the center line, based on the captured image of the lane. The plurality of parameters which is output by the neural network is subsequently used to reproduce the center line of the lane that may be used by the vehicle. The ego-lane of the vehicle, which is to be ascertained according to the present invention, is then identified as the ascertained center line of the lane that may be used by the vehicle. As a result of the correspondingly trained artificial neural network using regression to ascertain the parameters depicting the center line, compared to the classification of captured images, which is conventional in the related art in object detection, the technical advantage may be achieved that, by not having to assign each image point to a corresponding class, as is customary in classification, less computing capacity is needed to implement the regression than to classify the captured images. In this case, according to the present invention, the artificial neural network, based on the captured image, does not detect the lane that is actually used by the vehicle, as is conventional in the related art in classification-based object detection, but merely ascertains a center line, which extends through a center of the lane, based on the captured image representing the vehicle lane and, as an output, outputs corresponding parameters which characterize the center line. Since the neural network does not need to be capable of detecting the lane of the captured image precisely, the method according to the present invention is not dependent on roadway boundaries or roadway markings, present in the captured image, which are required in the conventional lane detection methods from the related art for detecting the lane that may be used by the vehicle. Since the method according to the present invention merely provides for the ascertainment of the center line depicting the center of the lane represented in the captured image, or the position of said center line within the captured image, and the identification thereof as an ego-lane of the vehicle, the method according to the present invention is not restricted to lanes or roadways which are built according to clothoid models. Conventional methods, from the related art, for predicting an ego-lane based on object detection in captured images require corresponding model descriptions to generate the ego-lane and are therefore primarily limited to road alignments which are likewise built according to corresponding clothoid models. The method according to the present invention, on the other hand, may be used for any road alignments or lanes, in particular for lanes without corresponding roadway boundaries or roadway markings or for lanes which are not configured according to clothoid models.

Within the context of the application, a lane is a roadway or a stretch of road or part of a route that may be used by a vehicle.

Within the context of the application, a center line of a lane is a line or surface element which extends through a center of the lane. The center of the lane, and hence the center line of the lane, extends along a longitudinal axis of the lane.

Within the context of the application, an ego-lane is an ego-trajectory of a vehicle and indicates a direction of travel which is to be followed by the vehicle.

Within the context of the application, a captured image is a video captured by a video camera of the vehicle and may be generated from a frame or a plurality of time sequential frames of the captured video.

According to a specific example embodiment of the present invention, the plurality of parameters of the center line comprises a plurality of image points of the captured image, the plurality of image points representing the center line in the captured image, and the output of the plurality of parameters comprising:

outputting a plurality of x-coordinates and a plurality of y-coordinates via the neural network, the x-coordinates and the y-coordinates defining the plurality of image points in the captured image.

A technical advantage may thus be achieved that precise ascertainment of the center line, and hence precise ascertainment of the ego-lane of the vehicle, is enabled. To this end, the neural network outputs a plurality of x- and y-coordinates of the captured image as parameters representing the center line, the x- and y-coordinates defining image points of the captured image which depict the center line in the captured image. The center line, and hence the ego-lane, may be precisely localized within the captured image via the correspondingly output x- and y-coordinates of the image points of the center line.

According to a specific example embodiment of the present invention, the generation of the center line comprises: connecting the image points of the captured image, which are represented by the plurality of x-coordinates and y-coordinates, by an nth degree polynomial function; and the identification of the center line as an ego-lane comprising:

identifying a polynomial function curve as an ego-lane.

A technical advantage may thus be achieved that precise generation of the center line, and hence precise ascertainment of the ego-lane, is enabled. As a result of connecting the x-y-coordinates of the image points of the captured image which represent the center line by a corresponding nth degree polynomial function, a continuous course of the center line may be achieved. By identifying the polynomial function curve which represents the center line as an ego-lane, a continuous course of the ego-lane within the captured image may be achieved.

According to a specific example embodiment of the present invention, the plurality of parameters comprises a plurality of parameters of a polynomial function or of a spline function or of a clothoid function, the polynomial function, the spline function and the clothoid function being designed to depict the center line, and the generation of the center line comprising:

implementing the polynomial function or the spline function or the clothoid function with the ascertained parameters and generating a curve of the polynomial function or of the spline function curve or of the clothoid function.

A technical advantage may thus be achieved that precise determination of the center line within the captured image, and hence precise ascertainment of the ego lane, is enabled. As a result, instead of the neural network outputting the x-y-coordinates of the image points representing the center line in the captured image as parameters, as in the above-described specific embodiment, parameters of a polynomial function and/or of a spline function and/or of a clothoid function are output as an output of the neural network, the aforementioned functions, with the output parameters included, being capable of representing the center line. A precise course of the ego-lane within the captured image is thus enabled.

According to a specific example embodiment of the present invention, the provision of the ego-lane comprises: depicting the polynomial function curve or the spline function curve or the clothoid function curve in the captured image as a continuous line element or a continuous surface element.

The technical advantage may thus be achieved that precise depiction of the ego-lane within the captured image is enabled. By depicting a curve of the polynomial function, spline function or clothoid function within the captured image as a continuous line element or surface element, a precise visual depiction of the predicted ego-lane within the captured image may be achieved.

According to a specific example embodiment of the present invention, the provision of the ego-lane comprises:
converting image coordinates of the ego-lane in the captured image into three-dimensional coordinates of a coordinate system fixedly associated with the vehicle; and
supplying the three-dimensional coordinates to a vehicle control.

A technical advantage may thus be achieved that, in addition or alternatively to the visual depiction of the ego-lane within the captured image, the ascertained ego-lane is additionally used to control the vehicle. To this end, the image coordinates of the ego-lane within the captured image are converted into three-dimensional coordinates of a coordinate system fixedly associated with the vehicle to be controlled and the correspondingly converted three-dimensional coordinates are supplied to a vehicle control. The vehicle control may subsequently generate corresponding control commands based on the three-dimensional coordinates of the ascertained ego-lane, which control commands control the vehicle according to the generated three-dimensional coordinates of the ego-lane.

According to a specific example embodiment of the present invention, information regarding a driving corridor which comprises the lane is furthermore included for the ascertainment of the center line, the information being included in the form of image points of the captured image and/or in the form of a metric measurement.

A technical advantage may thus be achieved that further precision in the ascertainment of the center line, and hence the ascertainment of the ego-lane, is enabled. In addition to the lane that may be used by the vehicle, which is depicted in the captured image, information about a driving corridor which comprises the lane is additionally included for the ascertainment of the center line and, based on this, for the ascertainment of the ego-lane. This enables precise ascertainment of the center line and therefore, based on this, the ego-lane, in particular in the case of lanes which are not clearly detectable.

According to a specific example embodiment of the present invention, information regarding a distance between the image points of the center line is furthermore included in a metric measurement for the ascertainment of the center line.

The technical advantage may thus be achieved that the precision in determining the ego-lane may be further increased. To this end, distances between image points of the center line within the captured image are included in a metric measurement for calculating the ego-lane. By including the distances between image points of the center line within the captured image, the correspondingly generated ego-lane may be provided with distance information in addition to the coordinate information of the image points within the captured image. The ego-lane, which is generated in such a way, is thus precisely transferable to the physical environment of the vehicle so that control of the vehicle based on the ego-lane information may be improved.

According to a specific example embodiment of the present invention, vehicle odometry information and/or map information of a road map which represents the lane is furthermore included for the ascertainment of the center line.

The technical advantage may thus be achieved that a further improvement in the precision of the ascertainment of the center line, and hence the ascertainment of the ego-lane, may be achieved. By including map information of a road map which represents the lane, ascertainment of the center line may be improved, in particular in the case of lanes which are not easily detectable in the representation. Including vehicle odometry information enables, in particular, the inclusion of information regarding a speed of the vehicle and/or a lateral control, which may each be included in the determination of the ego-lane.

According to a specific example embodiment of the present invention, the image captured by the camera sensor represents at least one further lane in addition to the lane that may be used by the vehicle, a further center line being ascertained for the at least one further lane, and the ego-trajectory comprising the center line of the lane and the further center line of the further lane.

A technical advantage may thus be achieved that a plurality of lanes may be included for predicting the ego-lane. In this case, the ego-lane may be generated as a combination of the plurality of center lines. A passing maneuver may thus be included in particular in the prediction of the ego-lane, which provides for a departure from the lane that may be currently used by the vehicle to an adjacent lane.

According to a second aspect of the present invention, a computing unit is provided, which is designed to execute the method for predicting an ego-lane for a vehicle according to one of the preceding specific example embodiments of the present invention.

According to a third aspect of the present invention, a computer program product is provided, comprising commands which, when the program is executed by a data processing unit, prompt the latter to execute the method for predicting an ego-lane for a vehicle according to one of the preceding specific embodiments of the present invention.

Exemplary embodiments of the present invention are explained below with the aid of the figures.

DETAILED DESCRIPTION OF EXAMPLE EMBODIMENTS

Figure 1:
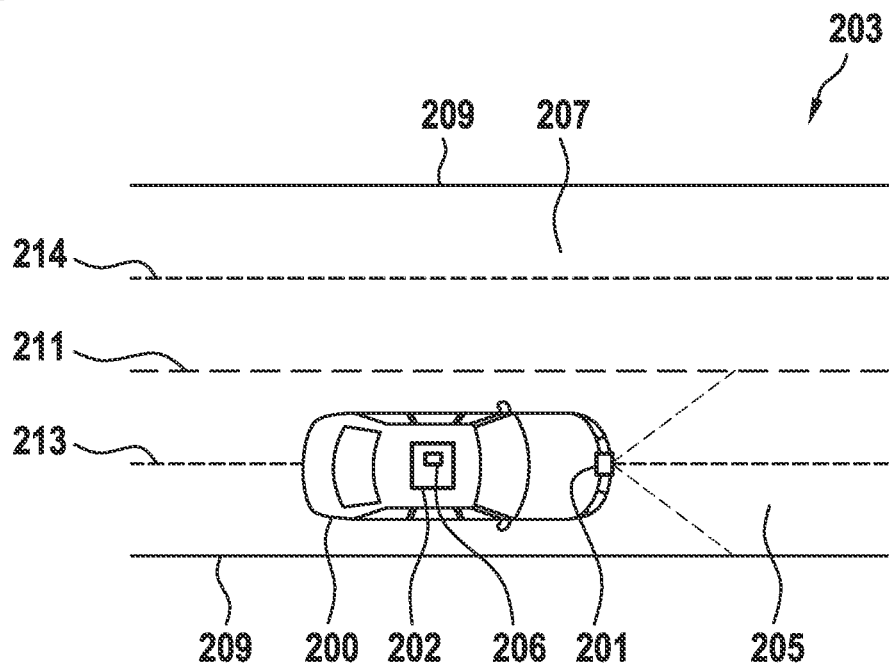
FIG. 1 shows a schematic depiction of a vehicle using a lane.

FIG. 1 shows a schematic depiction of a vehicle 200 using a lane 205.

In the shown specific embodiment, the depicted vehicle 200 comprises a camera sensor 201 for capturing images of the lane 205 used by the vehicle. The vehicle furthermore comprises a computing unit 202, which is designed to execute the method according to the present invention for predicting an ego-lane for a vehicle 200.

In the shown depiction, the vehicle 200 is using a lane 205 of a roadway 203. The roadway 203 furthermore has a further lane 207, arranged adjacent to the lane 205, and roadway boundaries 209 and roadway markings 211. A corresponding center line 213, 214 is furthermore depicted for each lane 205, 207 in FIG. 1. The center line 213, 214 is depicted as a line element or surface element defining a center of the respective lane 205, 207. The center line 213, 214 extends along a longitudinal direction of the respective lane 205, 207. The center of a lane 205, 207 extends, in each case, between two outer limits of the respective lane 205, 207, which, in the shown specific embodiment, are respectively provided by the roadway boundaries 209 and the roadway marking 211.

The camera sensor 201 may be in the form of a video camera, in particular an RGB camera.

In the shown embodiment, the vehicle 200 comprises, in particular, a vehicle control 206 which can be executed on the computing unit 202 and via which the vehicle can be controlled.

Figure 2:
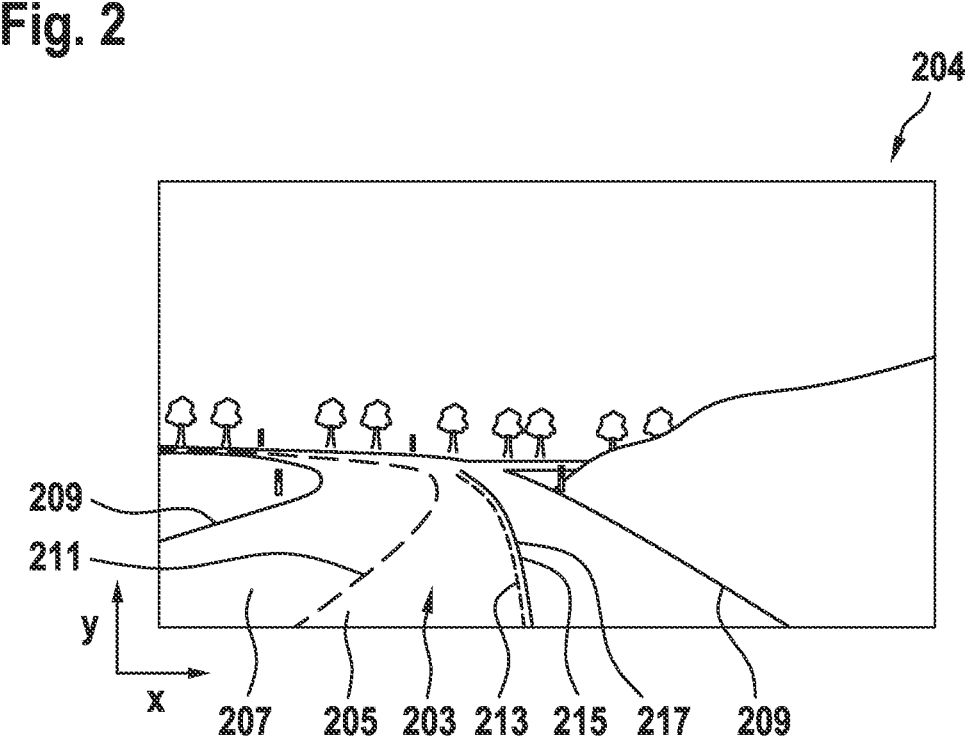
FIG. 2 shows a schematic depiction of a captured image of a lane that may be used by a vehicle.

FIG. 2 shows a schematic depiction of a captured image 204 of a lane 205 that may be used by a vehicle 200.

FIG. 2 shows a captured image 204, captured by a camera sensor 201, of a lane 205 that may be used by the vehicle 200. In the shown captured image 204, analogously to FIG. 1, the roadway that may be used by the vehicle 200 comprises a further lane 207 in addition to the roadway 203. The depicted roadway 203 furthermore has roadway boundaries 209 and a roadway marking 211. The lane 205 that may be used by the vehicle 200 may actually be used by the vehicle 200 at the time of capture of the image 204, and the captured image 204 may be captured while the vehicle 200 is moving. However, the captured image 204 may also be captured during a time in which the vehicle 200 is not driving in the lane 205, for example because the vehicle 200 is only just turning into the lane 205 or because the vehicle 200 is stationary at the time of capture of the captured image 204 and is not actively moving.

The shown captured image 204 shows the roadway 203 from the driver's perspective. The shown captured image 204 may therefore be captured by a camera sensor 201 provided on a vehicle front of a vehicle 200, similar to the specific embodiment shown in FIG. 1. In the shown perspective, the lane 205 is being used by the respective vehicle 200. A center line 213 of the lane 205 that is used by the vehicle 200 is furthermore depicted in the shown captured image 204.

Following the course of the center line 213 of the lane 205, an ego-lane 215 is furthermore depicted in the form of a continuous line element in FIG. 2. In the shown specific embodiment, the ego-lane 215 corresponds to the center line 213 of the lane 205. According to the method according to the present invention, the shown ego-lane 217 is generated by predicting an ego-lane for a vehicle.

According to the present invention, a trained neural network is implemented on the captured image 204 to predict the ego-lane 215. In this case, the trained neural network is trained via regression to output a center line, which extends through a center of the represented lane, and at least one parameter, which characterizes the ascertained center line 213 as an output value, based on captured lane images. According to the present invention, the ascertainment of the center line 213 through implementation of the correspondingly trained neural network is therefore not realized via object detection based on a classification of the captured image 204, but, rather, executed using a regression method implemented by the regression-trained neural network.

By implementing the regression-trained neural network on the captured image 204, the neural network is set up to output a plurality of parameters which characterize the center line 213 of the lane 205. The output parameters may be given by a plurality of x-coordinates and y-coordinates, for example, which define the individual image points within the captured image 204 which represent the center line 213 within the captured image 204 according to the determination by the trained neural network.

Alternatively to this, parameters which are output by the neural network as output values may comprise functional parameters of a polynomial function or of a spline function or of a clothoid function. In this case, the polynomial function or the spline function or clothoid function are designed to depict, for the respective parameter values, the center line 213 of the lane 205 within the captured image 204, which is ascertained by the trained neural network. By implementing the said functions according to the functional parameters ascertained by the neural network, the curve of the said functions depicts the center line 213 within the captured image 204.

After outputting the x- and y-coordinates of the image points representing the center line 213 in the captured image 204, by connecting the image points by a suitable nth degree polynomial function or by a separate spline function, the center line 213 detected by the neural network may be generated or reproduced. By implementing the functions connecting the image points output by the neural network, a description of the center line 213 with reference to the lane 205 shown in the captured image 204 may therefore be achieved via the respective curve of the implemented functions.

Alternatively to this, the center line 213 may be achieved by implementing the above-mentioned polynomial, spline or clothoid function according to the functional parameter ascertained by the neural network.

To predict the ego-lane 215 of the vehicle 200, the center line 213 ascertained in such a way, or the curve of the polynomial, spline or clothoid functions depicting the center line 213, is subsequently identified as the ego-lane.

The ego-lane 215, which is ascertained in such a way, may be subsequently provided by displaying the ego-lane 215, for example, as a continuous line element or a continuous surface element, within the captured image 204. The captured image 204, including the ego-lane 215 depicted as a line element or surface element, may therefore be displayed to a driver of the vehicle 200 as a predicted ego-lane 215, similarly to the schematic depiction in FIG. 2.

In addition or alternatively to this, the x- and y-coordinates of the image points depicting the center line 213 or ego-lane 215 within the captured image 204 may be transformed into corresponding three-dimensional coordinates of a coordinate system fixedly associated with the vehicle 200. The three-dimensional coordinates, which are transformed in such a way, may furthermore be supplied to the vehicle control 206 as a predicted ego-lane 215. Based on the three-dimensional coordinates of the ego-lane 215, the vehicle control 206 may effect a control of the vehicle which moves the vehicle along the ego-lane.

In the shown captured image 204, the ego-lane 215 is depicted in the form of a curve 217 of a corresponding polynomial, spline or clothoid function. The curve 217 of the said function is in turn depicted as a continuous line element within the captured image 204.

To ascertain the center line 213, in addition to the information of the captured image 204, information regarding a distance between the image points depicting the center line 213 in the captured image 204 may be included in a metric measurement. By including the distances between the image points of the center line 213, distance information may therefore be incorporated in the prediction of the ego-lane 215.

In addition or alternatively, when ascertaining the center line 213, information regarding a driving corridor comprising the lane 205 may be included. The driving corridor may be, for example, a spatial area within the captured image 204, which comprises the lane 205.

Alternatively or additionally, to ascertain the center line 213, map information of a road map which represents the lane 205, and/or vehicle odometry information, may be included. By including the map information, precise ascertainment of the center line 213 may be realized, in particular in the case of lanes 205 which are not clearly depicted. By including the vehicle odometry information, information regarding a speed or a lateral control of the vehicle 200 may be incorporated in the prediction of the ego-lane 215.

Figure 3:
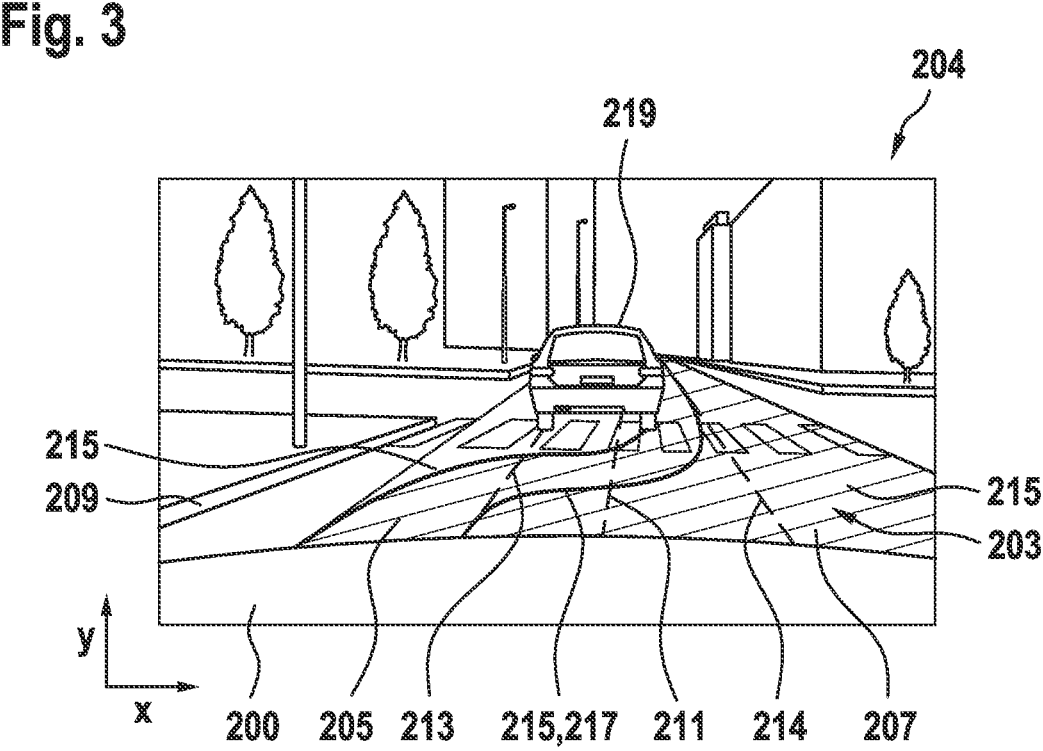
FIG. 3 shows a further schematic depiction of a captured image of a lane that may be used by a vehicle.

FIG. 3 shows a further schematic depiction of a captured image 204 of a lane 205 that may be used by a vehicle 200.

In the shown specific embodiment, to determine the ego-lane 215, in addition to the center line 213 of the lane 205 that may be used by the vehicle 200, a further center line 214 of a further lane 207 is included, which may likewise by used by the vehicle 200. As in FIG. 2, the captured image 204 may be captured while the vehicle 200 is moving, so the lane 205 is being used by the vehicle 200. However, the captured image 204 may also be captured at a time in which the vehicle 200 is not driving in the lane 205, for example because the vehicle 200 is only just turning into the lane 205 or because the vehicle 200 is stationary at the time of the capture of the image 204. In the shown captured image 204, a roadway 203 is in turn depicted from a driver's perspective of a vehicle 200 which is using the roadway. The roadway has two adjacently arranged lanes 205, 207, which are separated from each other via a roadway marking 211. The roadway furthermore has roadway boundaries 209. In the shown captured image 204, a further vehicle 219 is shown in the lane 205 originally used by the vehicle. To execute a passing maneuver, the vehicle 200 must therefore switch from the originally used lane 205 to the adjacent lane 207. A corresponding ego-lane 215 must therefore comprise both the originally used lane 205 and the further lane 207 to which the vehicle 200 must switch in the passing maneuver.

Therefore, according to the present invention, by implementing the correspondingly regression-trained neural network on the captured image 204, a center line 213 may be ascertained for the lane 205 and a further center line 214 may be ascertained for the further lane 207, which center lines extend through a center of the lane 205, 207 respectively and extend along the longitudinal direction of the lanes 205, 207. Through corresponding ascertainment of the parameters of the center lines 213, 214, for example the x- and y-coordinates of the image points depicting the center lines 213, 214 in the captured image 204 or the functional parameters of the polynomial, spline or clothoid functions depicting the center lines 213, 214, and through implementation of the corresponding polynomial, spline or clothoid functions based on the correspondingly ascertained parameters, a curve 217 of the said functions may be generated, which includes both the center line 213 of the lane 205 and also the further center line 214 of the further lane 207. According to the above-described specific embodiment, the ego-lane 215 is depicted by the curve 217, generated in such a way, of the functions which include the parameters which are ascertained by the neural network and represent the center lines 213, 214. In the shown specific embodiment, the center line 215, ascertained in such a way, is depicted both as a continuous line element, which describes the curve 217 of the said functions, and as a continuous surface element in the form of the depicted hatching, which comprises the lanes 205, 207 to be used by the vehicle 200 according to the passing maneuver.

Figure 4:
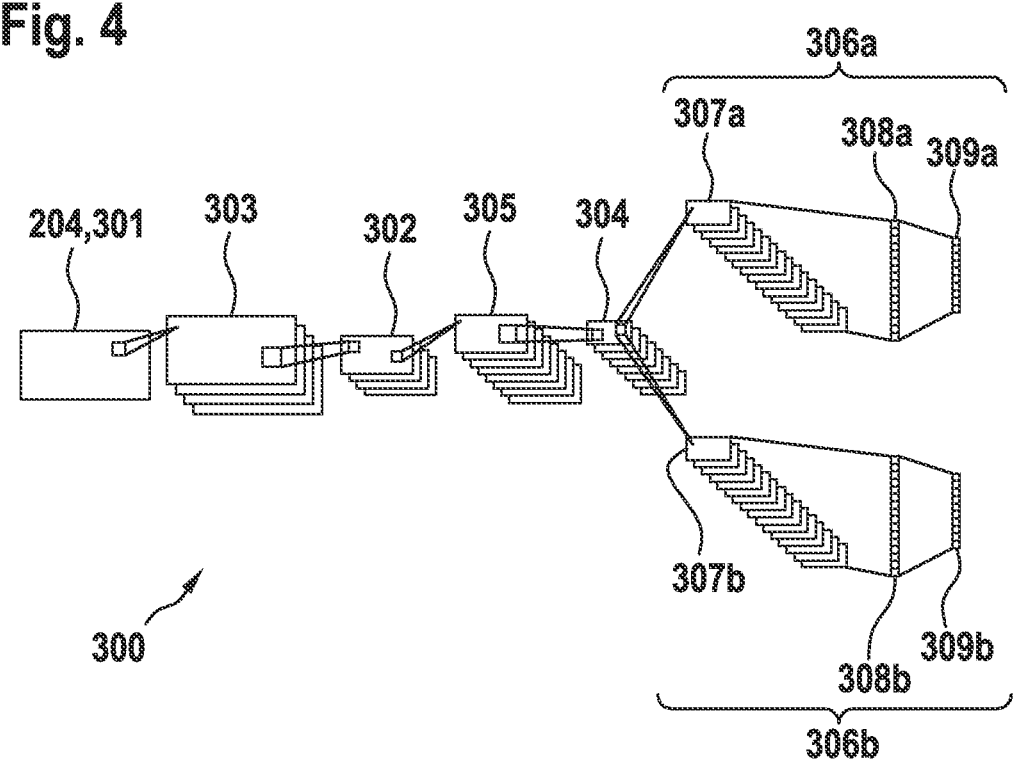
FIG. 4 shows a schematic depiction of a neural network for executing the method for predicting an ego-lane for a vehicle according to a specific example embodiment of the present invention.

FIG. 4 shows a schematic depiction of a neural network 300 for executing the method 100 for predicting an ego-lane 215 for a vehicle 200 according to a specific embodiment.

The neural network 300 may be designed in particular as a convolutional neural network, CNN.

Alternatively, the neural network 300 may be designed as a recursive neural network.

The neural network 300 according to the present invention comprises an input layer 301 for this purpose. According to the present invention, the captured images 204 captured by the camera sensor 201 of the vehicle 200 serve as input data of the neural network 300. The neural network 300 furthermore comprises a convolutional layer 303 for executing a convolution process of the captured image 204. The neural network 300 furthermore comprises a pooling layer 302 for executing a pooling process of the output data of the convolutional layer 303. The neural network 300 furthermore comprises a further convolutional layer 305 for executing a further convolution process of the output data of the pooling layer 302. The neural network 300 furthermore comprises a further pooling layer 304 for executing a further pooling process of the output data of the further convolutional layer 305.

The neural network 300 furthermore comprises two separate output paths 306A, 306B. Each output path 306A, 306B comprises a further convolutional layer 307A, 307B, respectively, for executing a further convolution process of the output data of the pooling layer 304. Each output path 306a, 306b furthermore has an additional pooling layer 308a, 308b for executing a pooling process of the output data of the convolutional layer 307a, 307b. The pooling layers 308a, 308b may be designed in particular as global average pooling layers. Each output path 306A, 306B furthermore comprises an output layer 309A, 309B for outputting the parameters depicting the center line 213. In this case, the parameters may be formed for example as x- and y-coordinates of the image points depicting the center line 213 in the captured image 204. By way of example, the neural network 300 may therefore output the x-coordinates of the respective image points via the output layer 309A, and the y-coordinates of the respective image points via the output layer 309B.

Alternatively to the number of convolutional and pooling layers indicated here, the neural network 300 may also be variably configured. Moreover, a plurality of mutually separate output paths may be realized.

Figure 5:
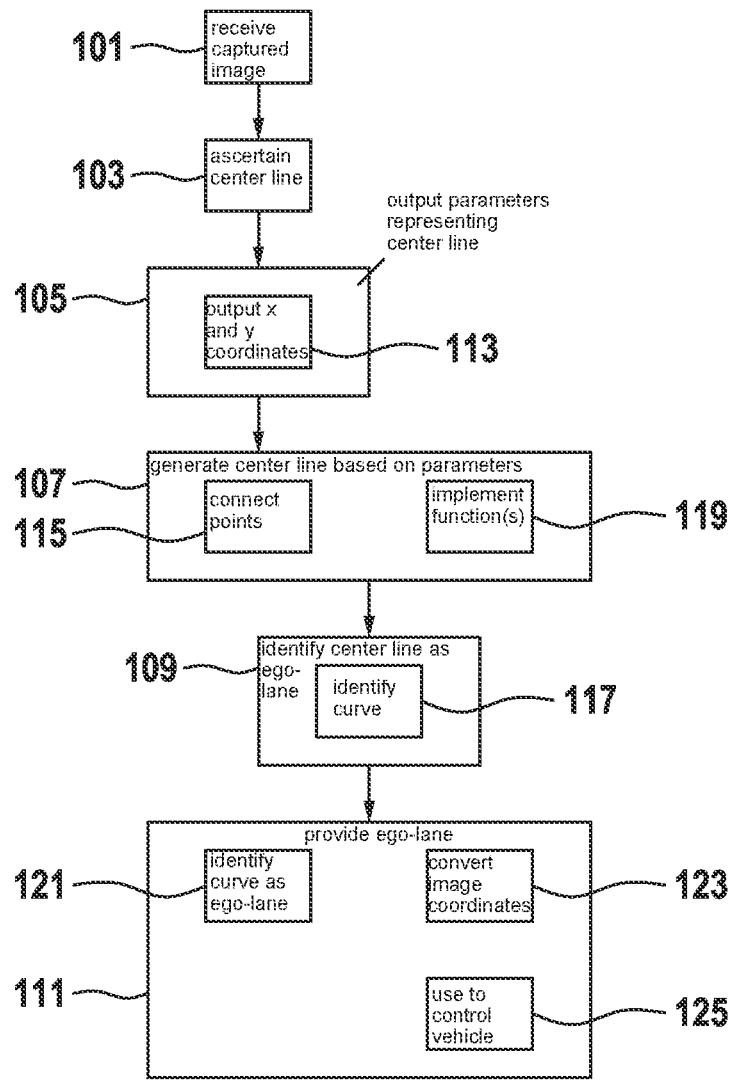
FIG. 5 shows a flow chart of the method for predicting an ego-lane for a vehicle according to a specific example embodiment of the present invention.

FIG. 5 shows a flow chart of the method 100 for predicting an ego-lane 215 for a vehicle 200 according to a specific embodiment.

To predict an ego-lane 213 of a vehicle 200, in a first method step 101, a captured image 204 captured by a camera sensor 201 of the vehicle 200 is firstly received, the captured image 204 depicting at least one lane 205 that is used by the vehicle 200. In this case, the captured image 204 may be generated, for example, by an individual frame of a video captured by a video camera. Alternatively to this, the captured image may comprise a plurality of time sequential frames of the captured video.

In a further method step 103, a center line 213 of the lane 205 that is or may be used by the vehicle 200 is ascertained based on the captured image 204. To this end, a correspondingly trained neural network 300 is implemented on the captured image 204, the neural network 300 being trained via regression to ascertain corresponding center lines 213, 214, which extend through a center of the respective lane 205, 207, based on a captured image of lanes 205, 207.

In a further method step 105, a plurality of parameters representing the center line 213 is output by the neural network as output data of the neural network 300.

To this end, in the shown specific embodiment, a plurality of x-coordinates and a plurality of y-coordinates is output as parameters by the neural network 300 in a method step 113. In this case, the x- and y-coordinates describe image points within the captured image 204 which represent the center line 213 of the lane 205 according to the ascertainment by the neural network 300.

In a further method step 107, the center line 213 is generated and represented based on the parameters output by the neural network 300.

To this end, in a method step 115, the x- and y-coordinates, output by the neural network 300, of the image points of the captured image 204 which represent the center line 213 are connected to each other through implementation of an nth degree polynomial function or a spline function. In this case, the implementation of the nth degree polynomial function or the spline function may be realized according to an adaptation or fit process to the x- and y-coordinates of the image points representing the center line 213, for example.

Alternatively or additionally, the neural network 300 may output parameters of a polynomial function and/or of a spline function and/or of a clothoid function which depict the center line 213, the said functions being designed to depict the center line 213. In a further method step 119, to generate the center line 213, the said functions may therefore be implemented according to the parameters ascertained by the neural network 300. The center line 213 may therefore be represented by the respective curves 217 of the said functions.

In a further method step 109, the center line 213 is identified as ego-lane 215.

To this end, in a method step 117, in particular the curve of the respectively implemented polynomial, spline or clothoid function is identified as the ego-lane 215.

In a further method step 111, the ego-lane 215 is provided.

To this end, in a method step 121, the curve 217 of the respectively implemented function, which depicts the center line 213 and is identified as ego-lane 215, is graphically depicted in the captured image 204 as a continuous line element or a continuous surface element.

Additionally or alternatively, in a step 123, the x- and y-coordinates of the image points depicting the center line 213 may be transformed into three-dimensional coordinates of a coordinate system fixedly associated with the vehicle 200.

In a method step 125, the three-dimensional coordinates, transformed in such a way, which depict the predicted ego-lane 215 within the three-dimensional fixed coordinate system, may be used to control the vehicle 200 according to the predicted ego-lane 215. The three-dimensional coordinates may therefore be supplied to a corresponding vehicle control 206 of the vehicle.

Figure 6:
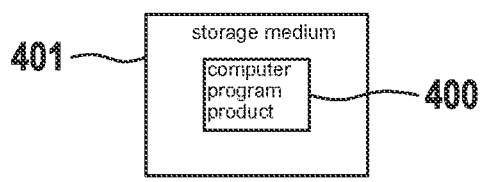
FIG. 6 shows a schematic depiction of a computer program product, according to an example embodiment of the present invention.

FIG. 6 shows a schematic depiction of a computer program product 400, comprising commands which, when the program is executed by a computing unit, prompt the latter to execute the method 100 for predicting an ego-lane 215 for a vehicle 200.

In the shown specific embodiment, the computer program product 400 is stored on a storage medium 401. In this case, the storage medium 410 may be any storage medium from the related art.

What is claimed is:

1. A method for predicting an ego-lane for a vehicle, comprising the following steps:
   receiving at least one image captured by at last one camera sensor of the vehicle an in which a lane is depicted;
   providing the received at least one image as input into a trained neural network that is trained via regression to directly convert the input at least one image into output of a representation coordinates of a center line that extends in a center of the lane without identifying boundaries of the lane, wherein the output is in a form of a plurality of parameters;
   generating the center line based on the output parameters of the center line;
   identifying the generated center line of the lane as at least part of the predicted ego-lane of the vehicle; and
   providing the predicted ego-lane.

2. The method as recited in claim 1, wherein the plurality of parameters of the center line include a plurality of image points of the captured image that are output by the neural network as a plurality of x-coordinates and a plurality of y-coordinates.

3. The method as recited in claim 2, wherein;
   the generation of the center line includes connecting the image points of the captured image, which are represented by the plurality of x-coordinates and y-coordinates, by an nth degree polynomial function; and
   the identification of the center line as the at least the part of the ego-lane includes identifying a polynomial function curve as the at least the part of the ego-lane.

4. The method as recited in claim 3, wherein;
   the plurality of parameters include a plurality of parameters of a function, which is a polynomial function or of a spline function or of a clothoid function; and
   the generation of the center line includes generating a curve represented by the with the ascertained parameters.

5. The method as recited in claim 4, wherein the provision of the ego-lane includes:
   depicting the generated curve in the captured at least one image as a continuous line element or a continuous surface element.

6. The method as recited in claim 3, wherein the providing of the ego-lane includes:
   converting image coordinates of the ego-lane in the captured image into three-dimensional coordinates of a coordinate system fixedly associated with the vehicle; and
   supplying the three-dimensional coordinates to a vehicle control.

7. The method as recited in claim 1, wherein information regarding a driving corridor which includes the lane is provided as additional input to the neural network for the conversion, and the information is included in the form of image points of the captured image and/or in the form of a metric measurement.

8. The method as recited in claim 2, wherein information regarding a distance between the image points of the center line is used in a metric measurement for refinement of the center line.

9. The method as recited in claim 1, wherein vehicle odometry information and/or map information of a road map which represents the lane is provided as additional input to the neural network for the conversion.

10. The method as recited in claim 1, wherein the image captured by the camera sensor represents at least one further lane, a further center line being ascertained for the at least one further lane, and the ego-lane includes the center line of the lane and the further center line of the further lane.

11. A computing unit comprising a processing system that includes at least one processor, wherein the at least one processor, for a prediction of an ego-lane for a vehicle, is configured to:
   receive at least one image captured by at last one camera sensor of the vehicle an in which a lane is depicted;
   provide the received at least one image as input into a trained neural network that is trained via regression to directly convert the input at least one image into output of a representation coordinates of a center line that extends in a center of the lane without identifying boundaries of the lane, wherein the output is in a form of a plurality of parameters;
   generate the center line based on the output parameters of the center line;
   identify the generated center line of the lane as at least part of the predicted ego-lane of the vehicle; and
   provide the predicted ego-lane.

12. A non-transitory computer-readable medium on which is stored a computer program including commands for predicting an ego-lane for a vehicle, the commands, when executed by a data processing unit, causing the data processing unit to perform the following steps:
   receiving at least one image captured by at last one camera sensor of the vehicle an in which a lane is depicted;
   providing the received at least one image as input into a trained neural network that is trained via regression to directly convert the input at least one image into output of a representation coordinates of a center line that extends in a center of the lane without identifying boundaries of the lane, wherein the output is in a form of a plurality of parameters;

generating the center line based on the output parameters of the center line;

identifying the generated center line of the lane as at least part of the predicted ego-lane of the vehicle; and providing the predicted ego-lane.

13. The method as recited in claim 1, further comprising executing an autonomous control of the vehicle based on the predicted ego-lane.

* * * * *